United States Patent
Wilson et al.

(10) Patent No.: US 9,151,459 B2
(45) Date of Patent: Oct. 6, 2015

(54) MOUNTING STRUCTURE FOR A HEADLAMP REFLECTOR

(75) Inventors: James Robert Wilson, Troy, MI (US); Russell Damian Bloomfield, Royal Oak, MI (US); Arunachala Parameshwara, Bangalore (IN); Poovanna Theethira Kushalappa, Bangalore (IN); Triloka Chander Tankala, Bangalore (IN); Ankit Kumar Garg, Bangalore (IN); Subrata Nayak, Bangalore (IN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 919 days.

(21) Appl. No.: 13/270,378

(22) Filed: Oct. 11, 2011

(65) Prior Publication Data
US 2013/0088885 A1    Apr. 11, 2013

(51) Int. Cl.
*B60Q 1/06* (2006.01)
*F21S 8/10* (2006.01)
*B60Q 1/068* (2006.01)

(52) U.S. Cl.
CPC .............. *F21S 48/1118* (2013.01); *B60Q 1/068* (2013.01); *F21S 48/1305* (2013.01); *F21S 48/1757* (2013.01)

(58) Field of Classification Search
CPC ......... F21V 17/02; F21V 17/06; F21V 21/30; F21S 48/17; F21S 48/1752; F21S 48/1757; B60Q 1/068
USPC ......... 362/277, 280, 282, 512, 514, 519, 319, 362/322, 323, 523
See application file for complete search history.

(56) References Cited

U.S. PATENT DOCUMENTS

| | | | |
|---|---|---|---|
| 1,509,068 A * | 9/1924 | Herron | 248/181.1 |
| 4,380,794 A | 4/1983 | Lawson | |
| 4,527,224 A * | 7/1985 | Sangiamo et al. | 362/282 |
| 4,935,853 A * | 6/1990 | Collins | 362/272 |
| 5,365,415 A | 11/1994 | Schmitt et al. | |
| 5,879,073 A | 3/1999 | Hori et al. | |
| 6,079,860 A | 6/2000 | Ito | |
| 6,234,655 B1 | 5/2001 | Suehiro et al. | |
| 6,354,722 B1 | 3/2002 | Montenegro et al. | |

(Continued)

FOREIGN PATENT DOCUMENTS

| | | |
|---|---|---|
| AT | 507554 A4 | 6/2010 |
| DE | 19514994 C1 | 5/1996 |
| EP | 1031786 A1 | 8/2000 |

OTHER PUBLICATIONS

German Patent No. 19514494 (C1); Publication Date: May 15, 1996; Abstract Only; 1 Page.

(Continued)

*Primary Examiner* — Thomas M Sember
(74) *Attorney, Agent, or Firm* — Cantor Colburn LLP

(57) ABSTRACT

In some embodiments, a headlamp assembly can comprise: a reflector, a mounting bracket, a housing, and a light source. The reflector can have a lip at a light source opening and a peripheral rim with a reflector portion extending from the lip to a peripheral rim. The mounting bracket can be configured to attach to the reflector. The mounting bracket can comprise attachment structures configured to mate with the lip, and adjustment features that enable horizontal, vertical, and pivotal adjustment. The light source can extend into the reflector through the light source opening.

24 Claims, 16 Drawing Sheets

(56) References Cited

U.S. PATENT DOCUMENTS

| | | |
|---|---|---|
| 6,355,723 B1 | 3/2002 | van Baal et al. |
| 6,471,386 B2 | 10/2002 | Oh |
| 6,705,749 B1 | 3/2004 | Smith |
| 6,773,149 B2 | 8/2004 | Kulkarni et al. |
| 6,821,005 B2 | 11/2004 | Uchida et al. |
| 7,270,453 B2 | 9/2007 | Wilson et al. |
| 7,278,762 B2 | 10/2007 | Schottland et al. |
| 7,329,462 B2 | 2/2008 | Gallucci et al. |
| 8,337,058 B2 * | 12/2012 | Gordin et al. ............. 362/427 |
| 8,408,770 B2 | 4/2013 | Yashiki et al. |
| 2004/0090780 A1 | 5/2004 | Burton |
| 2004/0208017 A1 | 10/2004 | Takiguchi et al. |
| 2005/0281038 A1 | 12/2005 | Burton |
| 2006/0291222 A1 | 12/2006 | Ando |
| 2007/0291500 A1 | 12/2007 | Maliar et al. |
| 2010/0091512 A1 | 4/2010 | Watanabe et al. |
| 2011/0210579 A1 | 9/2011 | Marur et al. |

OTHER PUBLICATIONS

Austrian Patent No. 507554 (A4); Publication Date: Jun. 15, 2010; Abstract Only; 1 Page.

International Search Report; International Application U.S. Serial No. PCT/US2012/059330; International Filing Date: Sep. 10, 2012; Date of Mailing: Dec. 20, 2012; 6 Pages.

Written Opinion of the International Searching Authority; International Application Serial No. PCT/US2012/059330; International Filing Date: Oct. 9, 2012; Date of Mailing: Dec. 20, 2012; 8 Pages.

Chinese Search Report; Chinese Application No. 201280049506.0; Mailing Date: Jul. 1, 2015; 2 Pages.

\* cited by examiner

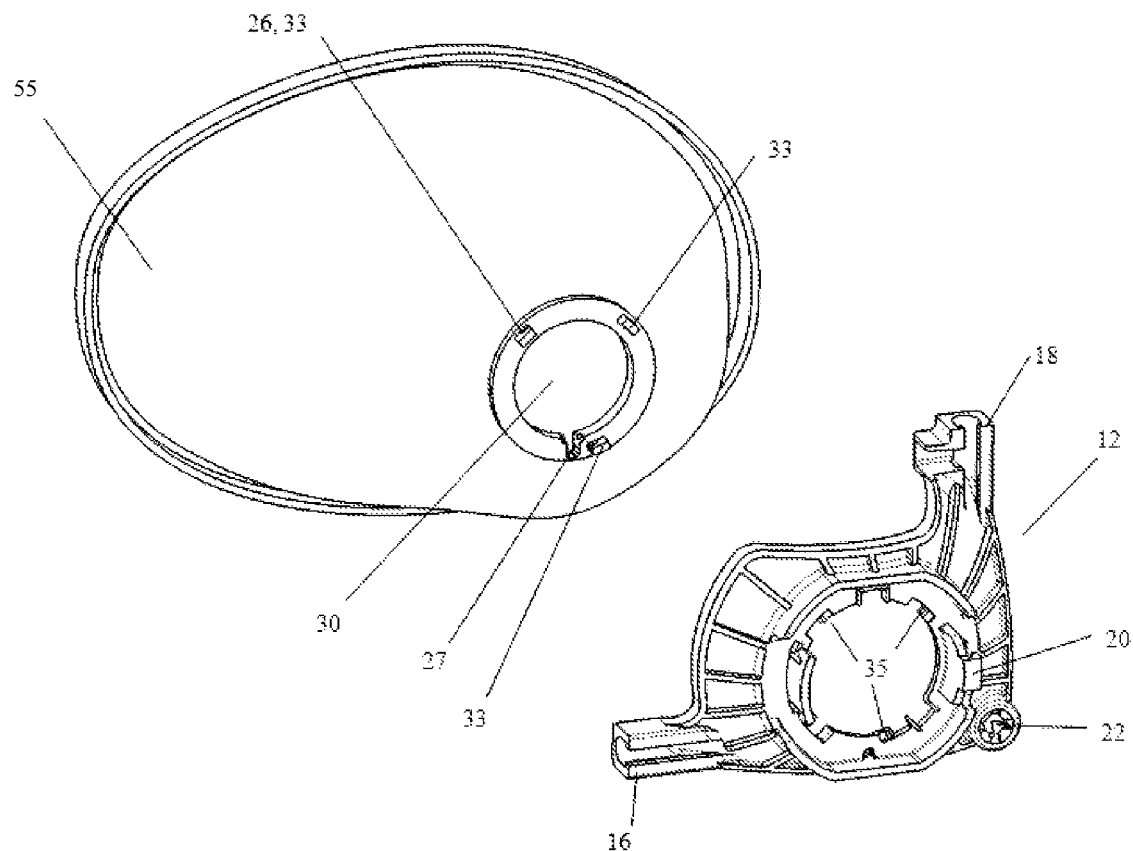

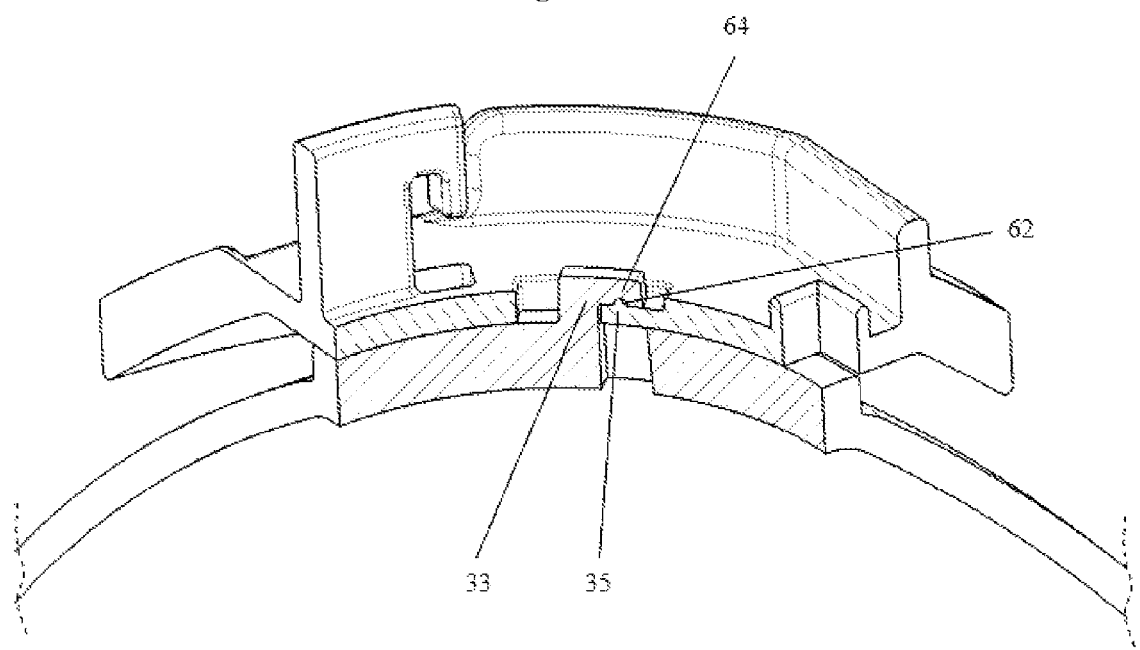

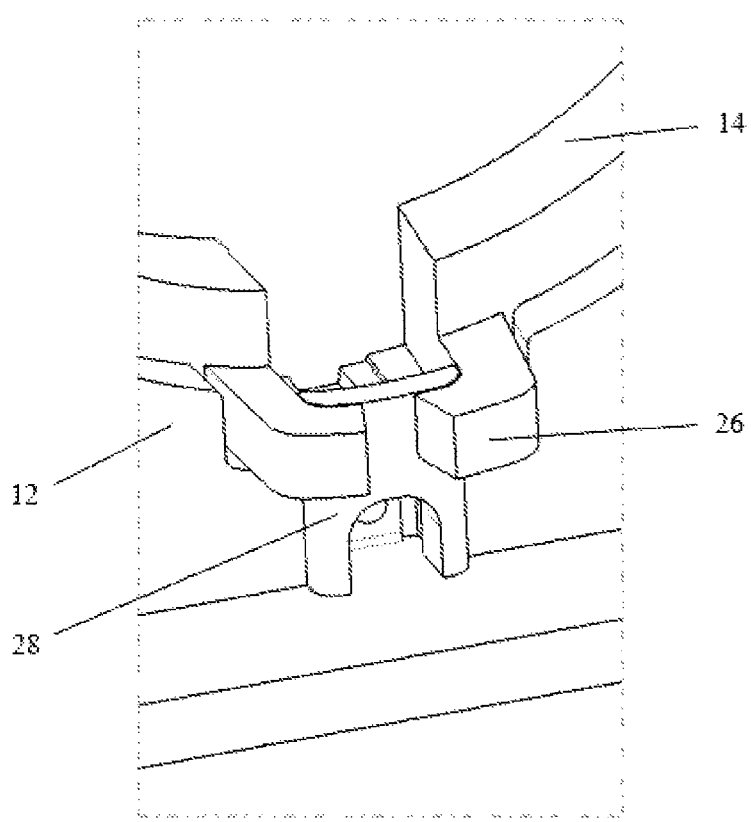

Length of each beam=1000mm

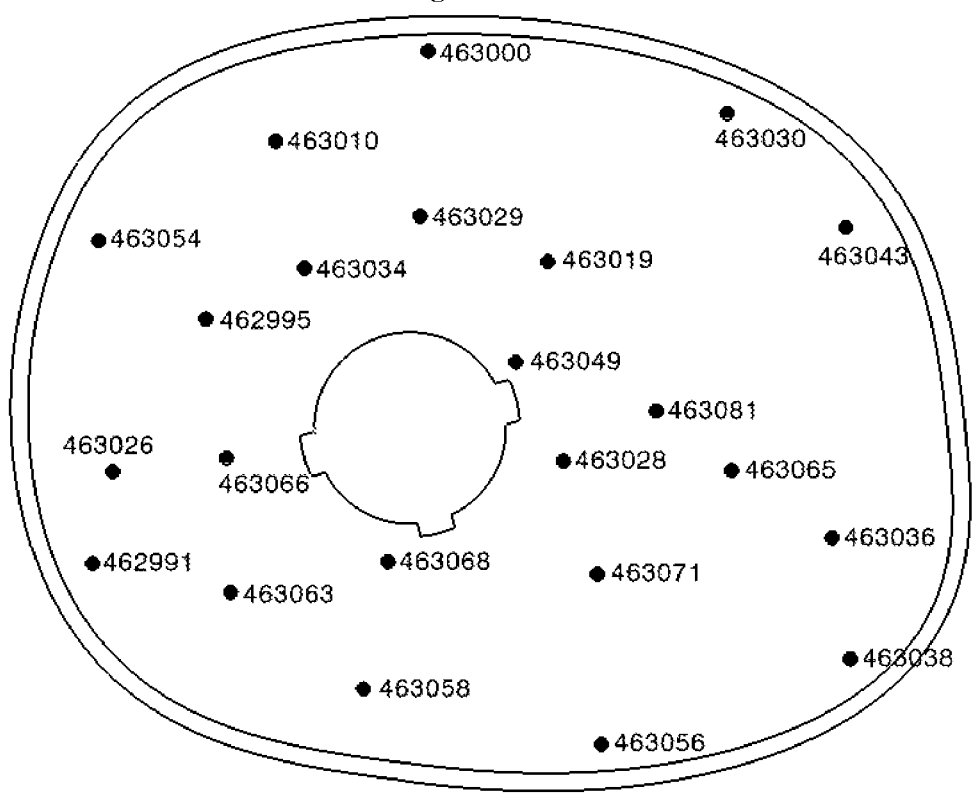

MOUNTING STRUCTURE FOR A HEADLAMP REFLECTOR

BACKGROUND

The present disclosure relates generally to mounting structures, and especially to mounting structures for vehicle headlamp reflectors.

In the automotive market, headlamp reflectors are often manufactured using thermoplastic or thermoset material. Conventional designs based upon thermoplastic or thermoset reflectors, however, often introduce high levels of induced stress and deformation during both the aiming process as well as thermal expansion which can result in the distortion of the reflector beam pattern. Also, sink marks on the reflector front surface can occur during injection molding due to the features on the rear side of the reflector and uneven shrinkage during cooling.

Accordingly, what is needed is a mounting structure configured for use with a headlamp reflector that can, for example, avoid sink marks on the reflector front surface, enable a defect free molded part, reduce induced stress on the reflector, and/or reduce distortion of the beam patterns.

BRIEF DESCRIPTION

Disclosed, in various embodiments, are mounting brackets which can be used in conjunction with vehicle components, such as headlamp reflectors.

In an embodiment, a headlamp assembly can comprise: a reflector, a mounting bracket, a housing, and a light source. The reflector can have a lip at a light source opening and a peripheral rim with a reflector portion extending from the lip to a peripheral rim. The mounting bracket can be configured to attach to the reflector. The mounting bracket can comprise attachment structures configured to mate with the lip, and adjustment features that enable horizontal, vertical, and pivotal adjustment. The light source can extend into the reflector through the light source opening.

In one embodiment, a method of making a mounting bracket can comprise: injection molding a plastic (e.g., thermoplastic and/or thermoset) to form a mounting bracket to attach to a headlamp reflector, the mounting bracket comprising attachment structures configured to mate with a lip of the headlamp reflector, and adjustment features that enable horizontal, vertical, and pivotal adjustment.

In one embodiment, a mounting bracket configured to attach to a reflector can comprise attachment structures configured to mate with a lip at a reflector bulb opening, wherein the mounting bracket comprises adjustment features that enable horizontal, vertical, and pivotal adjustment.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 2C depicts a perspective view of an embodiment of a reflector and bracket assembly including a turn and lock snapping mechanism.

FIG. 2D depicts an enlarged view of the turn and lock snapping mechanism of FIG. 2C.

FIG. 2F depicts zoomed view of the snapping mechanism of FIG. 1A at the bottom location.

FIG. 11 depicts representative nodes considered in the analysis of the Example.

DETAILED DESCRIPTION

Disclosed, in various embodiments, are mounting brackets which can be used in conjunction with vehicle components, such as headlamp reflectors to, for example, assist in avoiding sink marks on the reflector front surface, enabling a defect free molded part, reducing induced stress on the reflector, and/or reducing distortion of the beam patterns.

A headlamp reflector has many performance requirements. For example, a compliant beam pattern needs to be delivered while withstanding a severe heat requirement. Thus, it is desired for the reflector to reliably secure the light source relative to the optical prescription of the reflector. The reflector elements which are desired to deliver stable and reliable optical performance are often the same elements which must also withstand thermal stresses and adjustment-related static stresses within the reflector. The integrity of these optical elements may also be limited by surface sink, especially in the bulb fastening and other attachment locations.

It has been herein determined how to address the above concerns while enabling the delivery of robust optical performance by introducing a mounting bracket in which features such as a horizontal adjuster, a vertical adjuster, a pivot mechanism and/or a bulb clip can be integrated in the mounting bracket itself, as opposed to locating such attachment features on a headlamp reflector. In embodiments where the reflector has mounting attachments on the back surface thereof, sink marks and other defects are often present on the front surface and/or additional stresses are present that adversely affect the beam pattern, especially over time. Thus, embodiments can avoid the formation of sink marks on a reflector front surface and enable a defect free molded part. Embodiments also can reduce induced stress on the reflector and distortion of beam pattern, as aiming adjustments and resulting stresses can be localized within the mounting bracket itself.

Figure 1A:
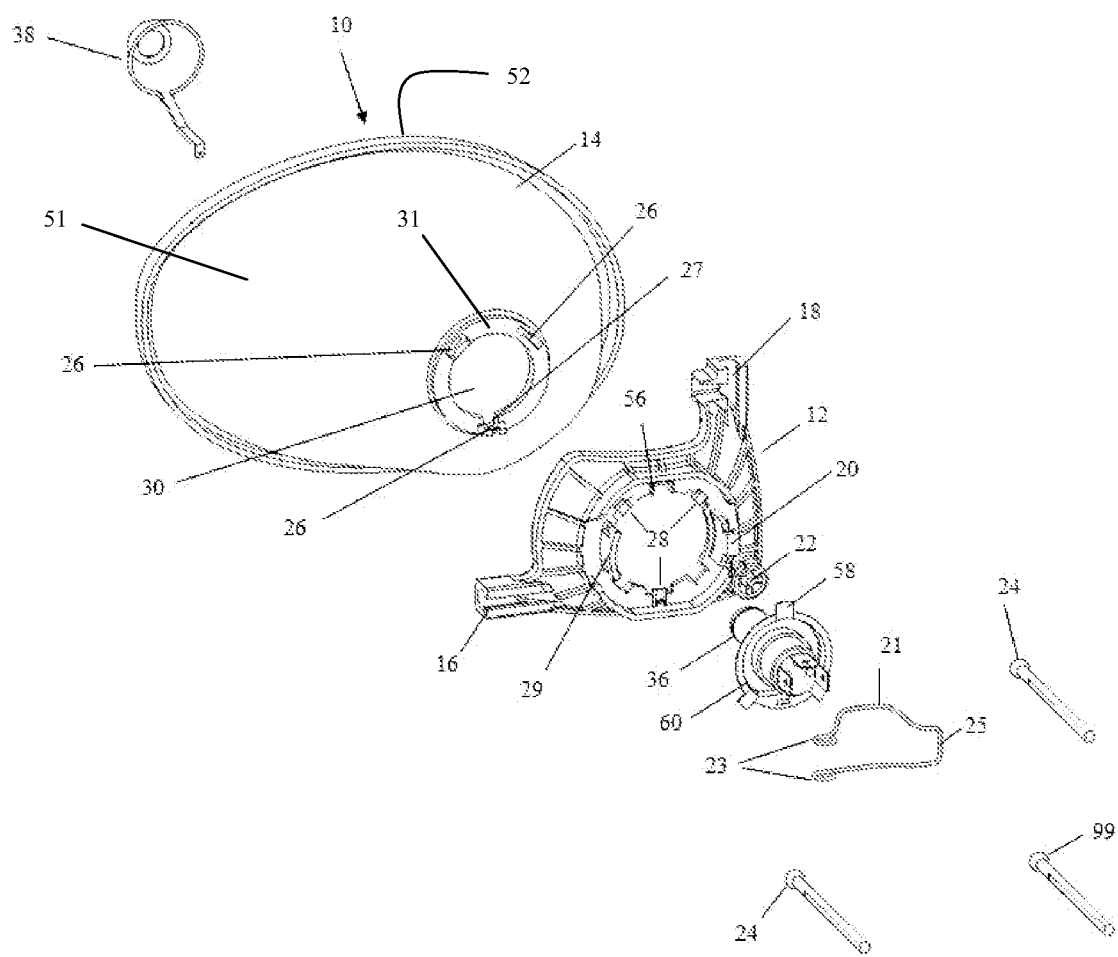
FIG. 1A depicts an exploded rear view of an embodiment of a portion of a headlamp assembly.
Figure 1B:
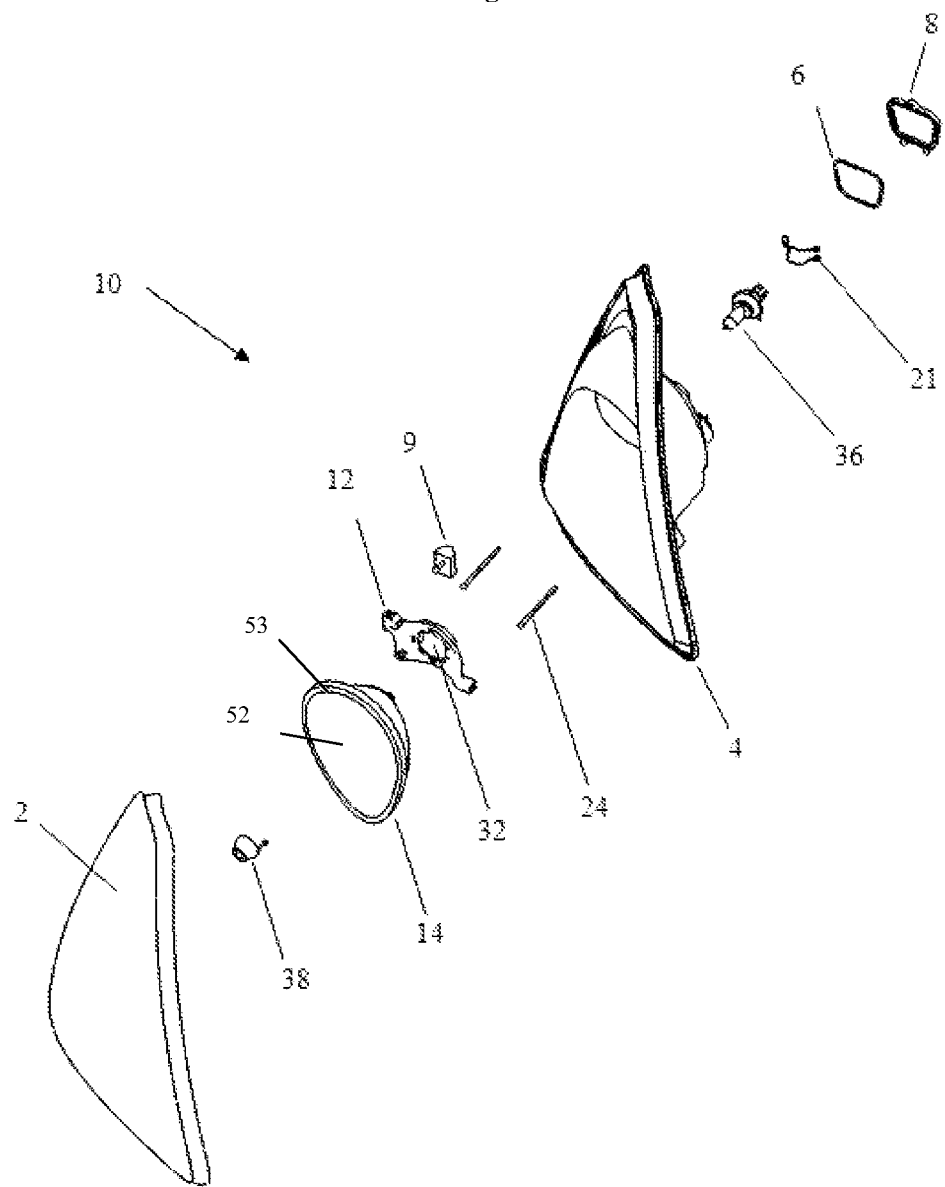
FIG. 1B depicts an exploded perspective view of an embodiment of the headlamp assembly of FIG. 1A.

Referring to the drawings, FIG. 1A is an illustration of an exploded view of a portion of an automotive headlamp assembly 10, according to embodiments, and FIG. 1B depicts the headlight assembly 10. As shown in FIG. 1B, the headlamp assembly 10 can comprise a headlamp reflector 14, a mounting bracket 12 configured to attach (e.g., snap, turn and lock, or otherwise fasten) to the headlamp reflector 14, a housing 4, a light source (e.g., bulb, capsule, light emitting diode (LED), and combinations comprising at least one of the foregoing) 36, and a lens 2 configured to attach to the housing 4 and enclose the reflector 14. The attachment of the reflector can be solely via the mounting bracket and in the immediate vicinity of the reflector light source (e.g., bulb) opening; e.g., there are no (e.g., the reflector is free) other attachment structures (free of adjustment features) on the reflective portion 55 (e.g., between the lip 31 and the rim 53). In other words, the rear surface 51 of the reflector (i.e., on the surface opposite the reflective surface 52) is free of attachment or adjustment features; it is smooth. The headlamp assembly 10 also can include, for example, seal 6 configured for cap 8, and leveler 9 which assists in the positioning of the housing 4.

The mounting bracket 12 can be made of any suitable material, e.g., a plastic material; especially thermoplastic material and/or thermoset material. As structural rigidity and dimensional stability of the mounting bracket 12, throughout the entire operating temperature range of the system, will offer further performance enhancements specific to the reflector beam pattern stability, a reinforced or non-reinforced amorphous thermoplastic may offer benefits for the mounting bracket itself. Unlike a semi-crystalline material, an amorphous material will help deliver isotropic shrinkage and expansion, while maintaining a high level of mechanical integrity at operating temperatures suitably below its glass transition temperature. Bracket 12 also can be made by any suitable manufacturing technique, such as injection molding or injection compression molding.

Figure 2A:
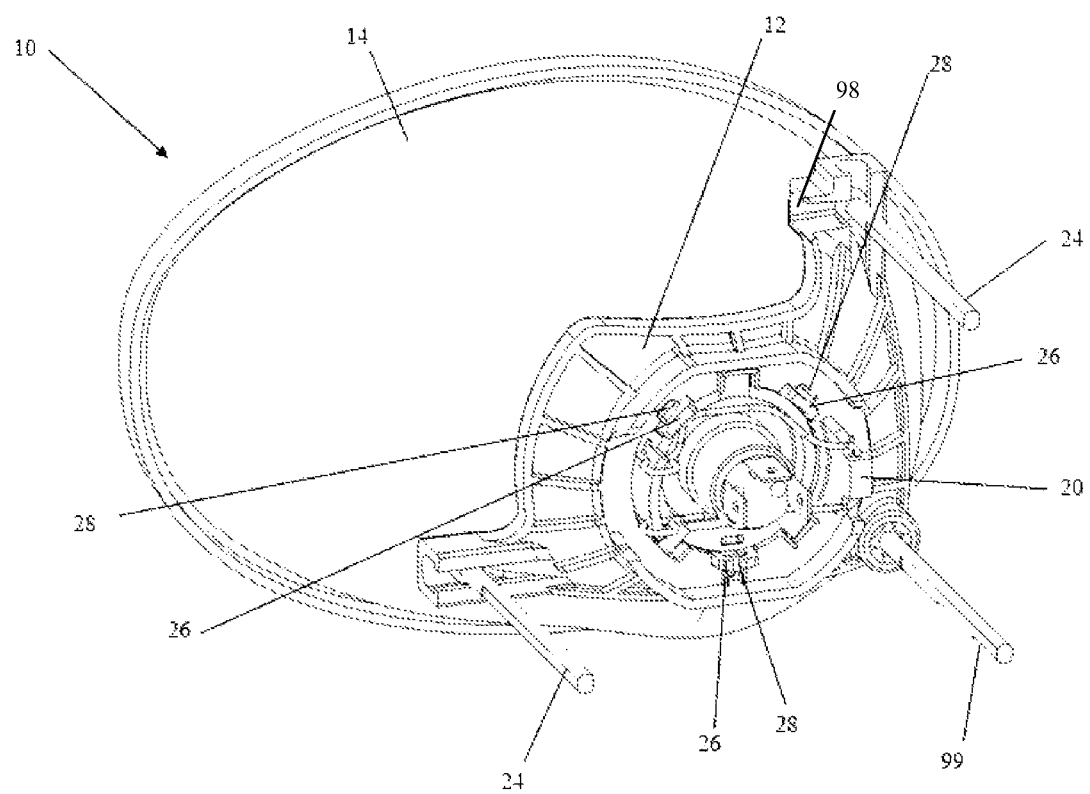
FIG. 2A depicts a perspective view of FIG. 1A in assembled form.

FIG. 1A depicts mounting bracket 12 comprising adjustment features such as a horizontal adjustment (e.g., horizontal adjustment slide channel 16), a vertical adjustment (e.g., vertical adjustment slide channel 18), a clip holding mechanism 20 configured for a clip 21, and a pivot mechanism 22. The horizontal adjustment slide channel 16, vertical adjustment slide channel 18 and pivot mechanism 22 allow the horizontal and vertical adjustment of the reflector 14 by, for example, the insertion of adjustment pins 24 and pivot pin 99. These adjustment elements also can provide, for example, three points (16, 18, 22) to receive the adjustment pin(s) and pivot pin, respectively, and attach housing 4 to the mounting bracket 12, as shown in FIG. 2A. More specifically, the horizontal adjustment slide channel 16 can comprise a horizontally oriented slot (e.g., an opening or a groove) and the vertical adjustment slide channel 18 can comprise a vertically oriented slot, as shown in FIG. 1A. The horizontal and vertical adjustment of the reflector beam pattern is achieved by rotating the reflector about each a vertical axis and a horizontal axis which contains the pivot pin as secured in the pivot mechanism 22. The rotation of the reflector about each of these axes is accomplished by a linear fore/aft travel of the appropriate adjustment pin which interfaces at each the horizontal adjustment slide channel 16 location and the vertical adjustment slide channel 18 location. Insofar as the reflector travels in an arc around either the vertical axis or horizontal axis during the linear adjustment of the respective adjustment pin, the horizontal adjustment slide channel 16 and vertical adjustment slide channel 18 provides the necessary degree of freedom in each the horizontal direction and vertical direction which avoids undesirable binding which would otherwise occur if relative sliding was not allowed at each of the adjustment pin locations. In this fashion, the incorporation of the horizontal adjustment slide channel 16 and the vertical adjustment slide channel 18 within mounting bracket 12 allows for stress-free rotational adjustment of the reflector about pivot pin 99 via linear adjustment of the adjustment pins.

Figure 6:
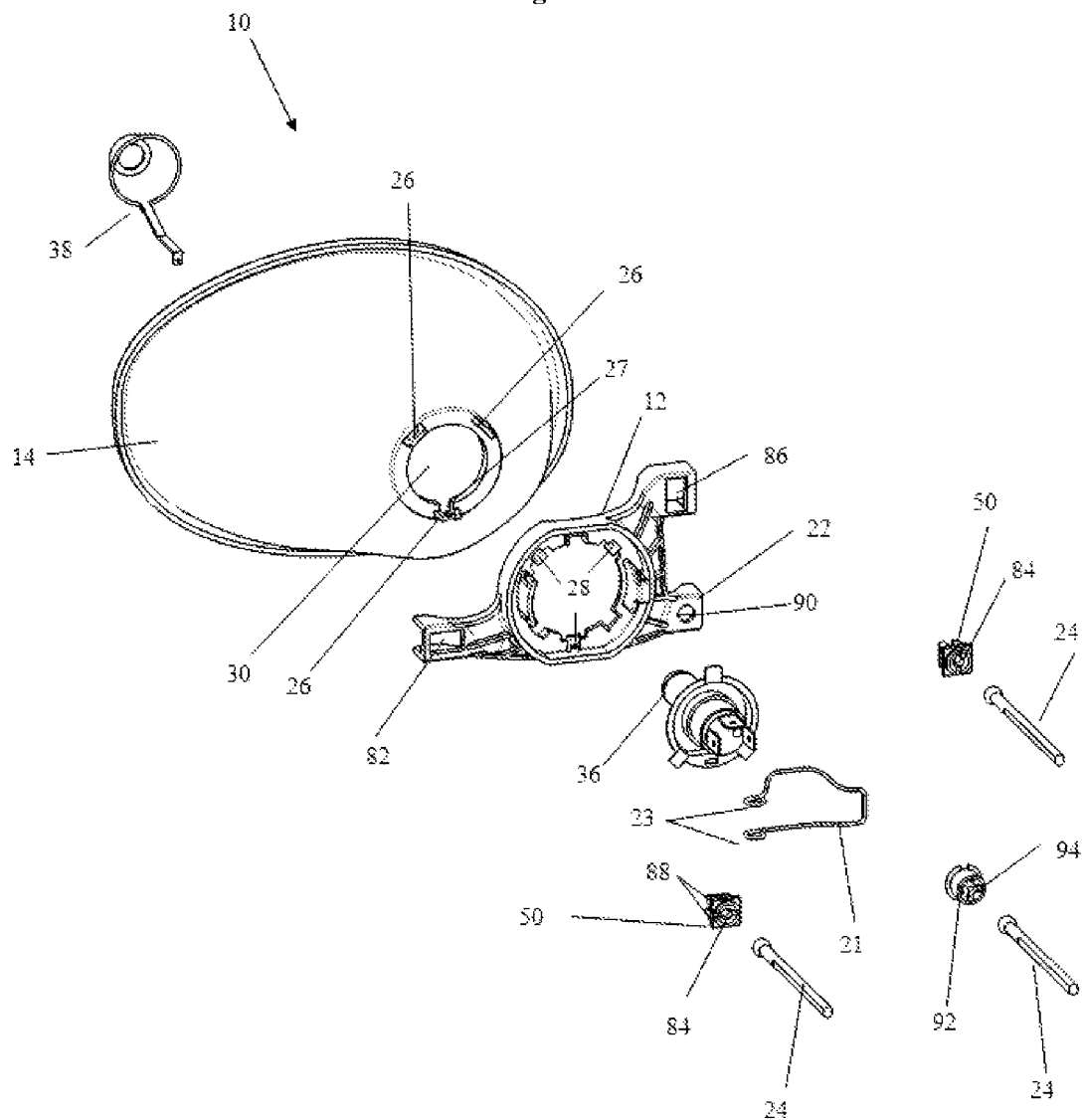
FIG. 6 depicts an exploded rear view of an embodiment of a portion of a headlamp assembly including plug in mechanisms.
Figure 7A:
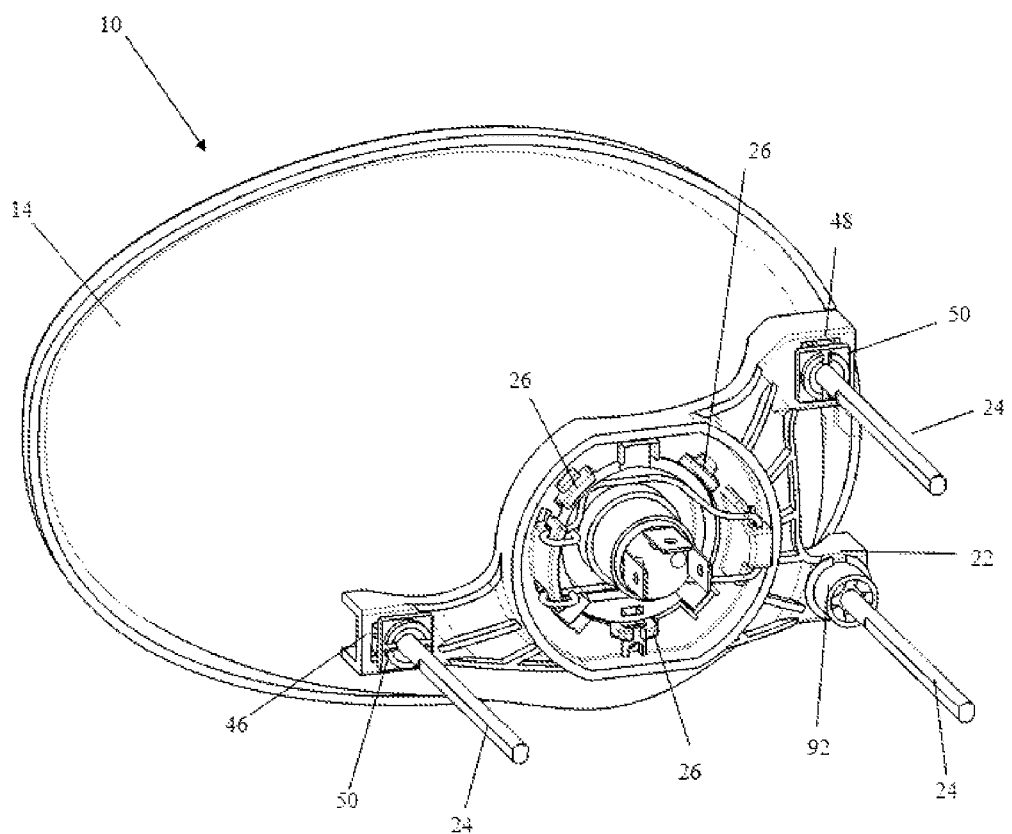
FIG. 7A depicts a perspective view of FIG. 6 in assembled form.
Figure 7B:
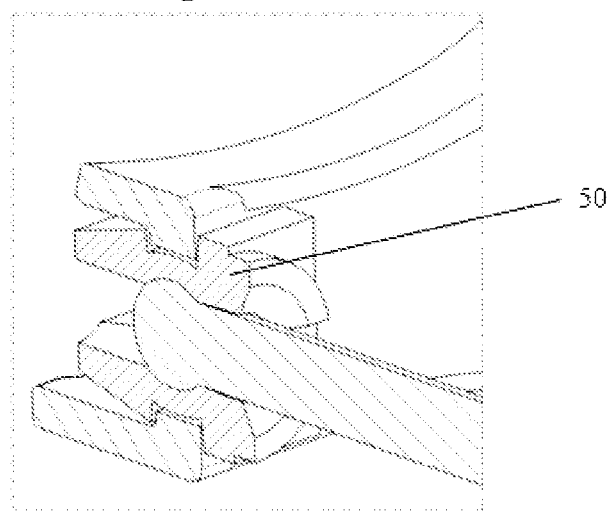
FIG. 7B depicts a cross-sectional view of the plug in mechanisms of FIG. 6 taken through the plug in mechanism.

FIG. 6 illustrates an alternative adjustment scheme. Here, mounting bracket 12 still employs a horizontal adjustment element, a vertical adjustment element and a pivot mechanism. The horizontal adjustment element 46 comprises an adjustment pin 24 extending through a bore 84 in a slider clip 50 that is secured to an opening 82 in mounting bracket 12. Similarly, a vertical adjustment element 48 comprises an adjustment pin 24 extending through a bore 84 in a slider clip 50 (in fact, both horizontal and vertical adjusting slider clips can optionally be the same) that is secured to an opening 86 in mounting bracket 12. The slider clip 50 can be a separate element that can be attached into an opening 82,86 in the mounting bracket 12. In the embodiment illustrated in FIG. 6, the slider clip 50 has a pair of flexible tangs 88 that can flex together and return to their resting state when inserted into the opening 82,86, so as to snap fit to the mounting bracket 12. In addition to the horizontal adjustment element 46 and the vertical adjustment element 48, the mounting bracket comprises pivot mechanism 22. As with the horizontal adjustment element 46 and the vertical adjustment element 48, the pivot mechanism 22 can comprise an adjustment pin 24 that extends through a bore 94 in a pivot clip 92 that is secured to an opening 90 in mounting bracket 12. In this fashion, a unique material of enhanced tribological (wear and frictional) properties can be employed for each the pivot clip and slider clip subcomponents in order to enhance sliding performance relative to the opening 82,86, further ensuring a non-binding adjustment operation of the reflector. The openings 82,86 will be sized and located accordingly in order to ensure the appropriate degree of freedom. This embodiment can also offer a simplified design which can eliminate slide action in the mounting bracket 12 injection molding tool which would otherwise be required for forming the horizontal adjustment slide channel 16 and the vertical adjustment slide channel 18 regions as previously described.

The specific locations of the adjustment features, (horizontal 16,46, vertical 18,48, and pivot 22), as incorporated into mounting bracket 12, will be established based on the allowable packaging space and adjustment needs of any particular headlamp into which the mounting bracket 12 is incorporated. The adjustment features can be located, for example, so as to form a right triangle, and wherein the horizontal adjustment feature and the vertical adjustment feature form a hypotenuse. (See, for example, the dashed line in FIG. 2E.)

The mounting bracket 12 further has a light source (e.g., bulb) opening 32, around which attachment elements (e.g., snap engagements 28) configured to attach the mounting bracket 12 to the reflector 14 are located. The light source opening 32 is further configured to mate with the bulb 36 such that the bulb 36 will extend through the mounting bracket 12 and into the reflector 14. For example, located around the light source opening 32 can be areas (e.g., guide features) 56 configured to mate with protrusions 58 extending from the bulb mounting 60. In this embodiment, the protrusions have a size and shape to mate with the areas 56. Once the bulb 36 is inserted into the reflector 14 such that the protrusions 58 of the bulb mounting 60 engages the mounting bracket 12, the clip 21 can be attached to the bracket 12. The clip 21 is attached to the bracket 12 by inserting the closed end 25 of the clip 21 into the clip holding mechanism 20. Then, each of the hoops 23 can then be attached to opposite sides of the T-bracket 29 extending from an opposite side of the bracket light source opening 32. In this way, the assembly of the clip 21 to the mounting bracket 12 results in a deflection of clip 21 as it reacts against the clip holding mechanism 20, the T bracket 29, and the bulb mounting 60 location. The clip 21, in turn, provides a force that secures the bulb mounting 60 location against the reflector lip 31. (See FIG. 2E.)

Figure 2B:
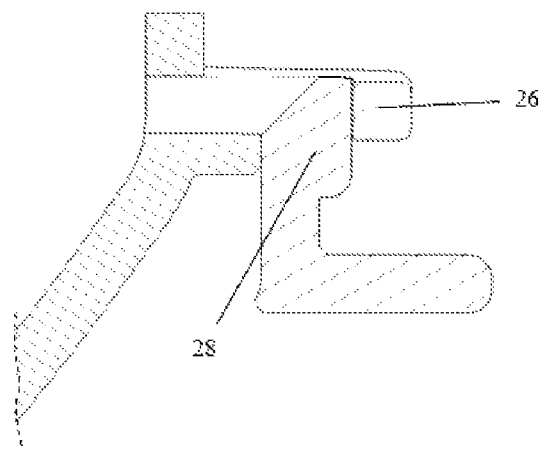
FIG. 2B depicts a cross-sectional view of a snapping mechanism of FIG. 1A.

The mounting bracket 12 attaches to the reflector 14 at the lip 31 surrounding the bulb opening 30 such that the mounting bracket 12 and the lip 31 interlock. For example, the mounting bracket 12 can be configured to snap to the reflector 14 as shown, for example, in FIG. 2A. FIG. 2A depicts the mounting bracket 12 of FIG. 1A assembled to the reflector 14 with the use of a snapping mechanism. The snapping mechanism can comprise a reflector connector 26 located on the reflector 14 and a mounting bracket engagement 28 located on the mounting bracket 12, as shown in FIGS. 1A and 2B. Here, a combination of slide insert and snap engagements are illustrated. The two fixing locations (e.g., the top two locations) can be inserted from the side, connecting the mounting bracket and reflector together, and the other fixing location (e.g., the bottom fixing location) snaps to the bracket. (See FIG. 2F also.) More particularly, the reflector 14 can comprise a connector 26 configured to snap into mounting bracket 12, as shown in FIG. 2F and attach to engagement (e.g., snap engagement) 28 of mounting bracket 12. The mounting bracket 12 can comprise a plurality of engagements 28 to respectively attach to (e.g., slide, turn, and/or snap together with) a plurality of connectors 26 located on reflector 14. FIGS. 1A and 2A depict reflector 14 comprising three connectors 26 to attach to mounting bracket 12 together with three engagements 28, respectively, located on mounting bracket 12. However, more or less connecting features (e.g., snaps, turn and lock elements, etc.) could be employed depending upon, for example, the size of the reflector 14 and mounting bracket 12. It is also understood that the connectors could be located on the mounting bracket and the engagements on the lip 31 of the reflector 14.

FIG. 1A also depicts reflector 14 comprising the lip 31 wherein the connector features (e.g., snaps, snap engagements, and/or turn and lock elements) are evenly distributed around the lip 31. For example, the reflector connectors 26 can be, for example, located approximately 120 degrees apart, as shown in FIG. 1A. Alternatively, the connectors 26 could be located greater than or less than 120 degrees apart. The reflector 14 can be have any shape that enables the desired beam pattern (e.g., for a motor vehicle headlamp). For example, the reflector 14 can be asymmetric. It can be formed as a paraboloid of revolution, e.g., a parabolic reflector, with the inner surface being a reflective surface 52. The reflective surface 52 is located between the outer peripheral rim 53 and the reflector lip 31 where the light source 36 is inserted into the reflector 14. The material of the reflector can be any material that has the desired reflective surface, sufficient structural integrity for use as a headlamp reflector, and that can withstand the use conditions (e.g., heat of the light source, and environmental temperature conditions). Examples of possible materials include plastic ceramic, metal, glass, or a combination comprising at least one of the foregoing. For example, the reflector can comprise at least two different materials, such as a plastic (e.g., thermoplastic such as polycarbonate, polyetherimide, and so forth) and a second material such as ceramic, metal, glass, thermoset, or a combination comprising at least one of the foregoing.

Figure 2E:
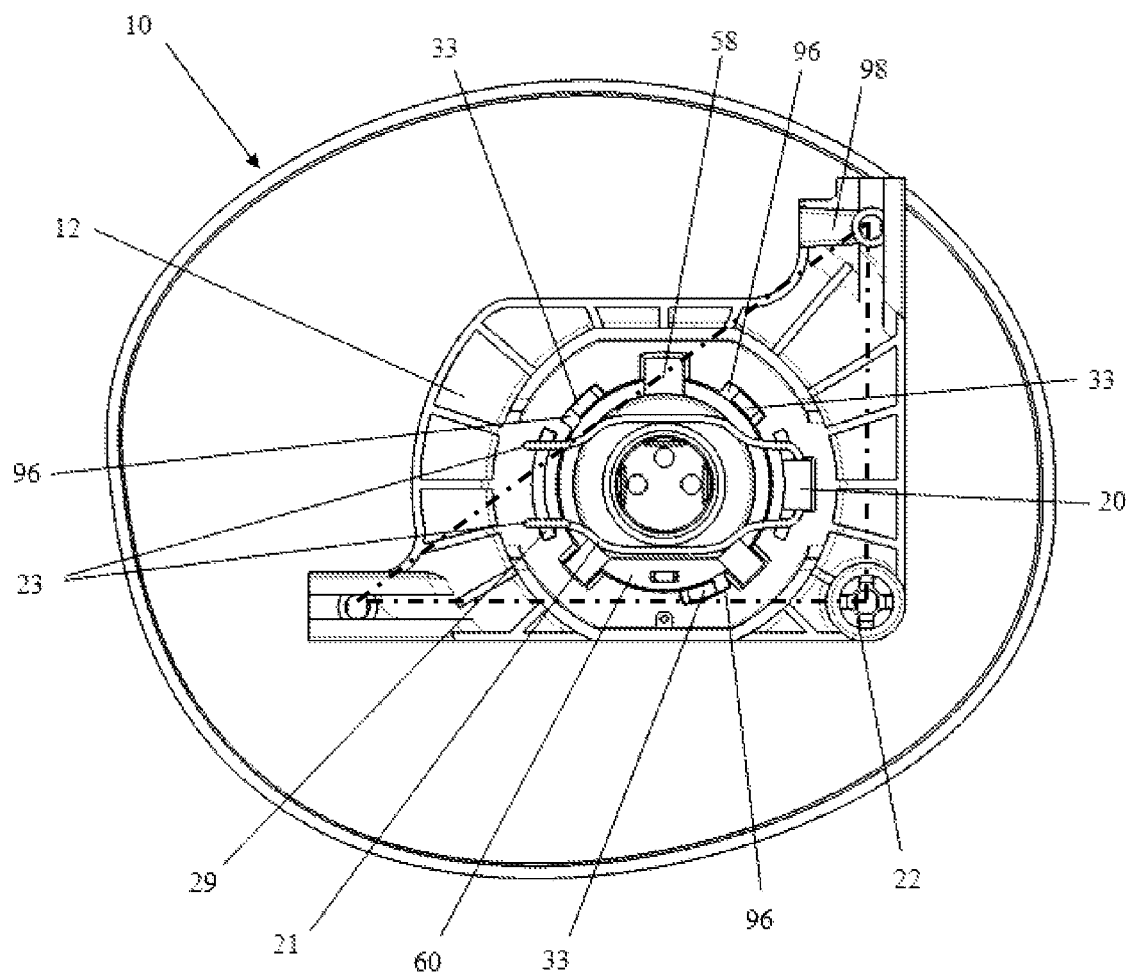
FIG. 2E depicts a rear view of the assembled construction of FIG. 2C depicting the turn and lock snapping mechanism.

FIG. 2C depicts another exemplary embodiment of attachment features that enable the interlocking of the mounting bracket and lip 31. Here, a turn and lock mechanism can secure the reflector 14 to the mounting bracket 12. Specifically, according to embodiments, the turn and lock mechanism can comprise reflector hook 33 and mounting bracket engagement 35. The hook 33 can further snap onto the engagement 35, if the engagement comprises a deflector 62 configured to deflect the hook 33 and engage the cavity 64 when assembled. (See FIG. 2D.) Snaps 33 and 35 can lock together upon turning, as shown in FIGS. 2E and 2D. Hence, during assembly, the hooks 33 can be inserted through openings 96 in the mounting bracket 12. Relative motion is then created between the mounting bracket 12 and the reflector 14 such that the engagement 35 is inserted into the mouth 96 of the hook 33, thereby locking the elements together. (See also FIG. 2E.) It is noted that the hooks 33 and engagements 35 could be employed in any combination with, or as an alternative to, the other fastening features disclosed herein. It is also understood that the hooks can optionally be located on the mounting bracket 12 and the engagements on the reflector 14.

For the ease of fixing the reflector assembly 10 to the housing, an assembly slot 98 (e.g., horizontal slot) can be provided on the bracket. This assembly slot 98 will allow the one directional motion of the reflector bracket through the adjustment pin 24 (as shown in FIG. 2E).

Figure 3:
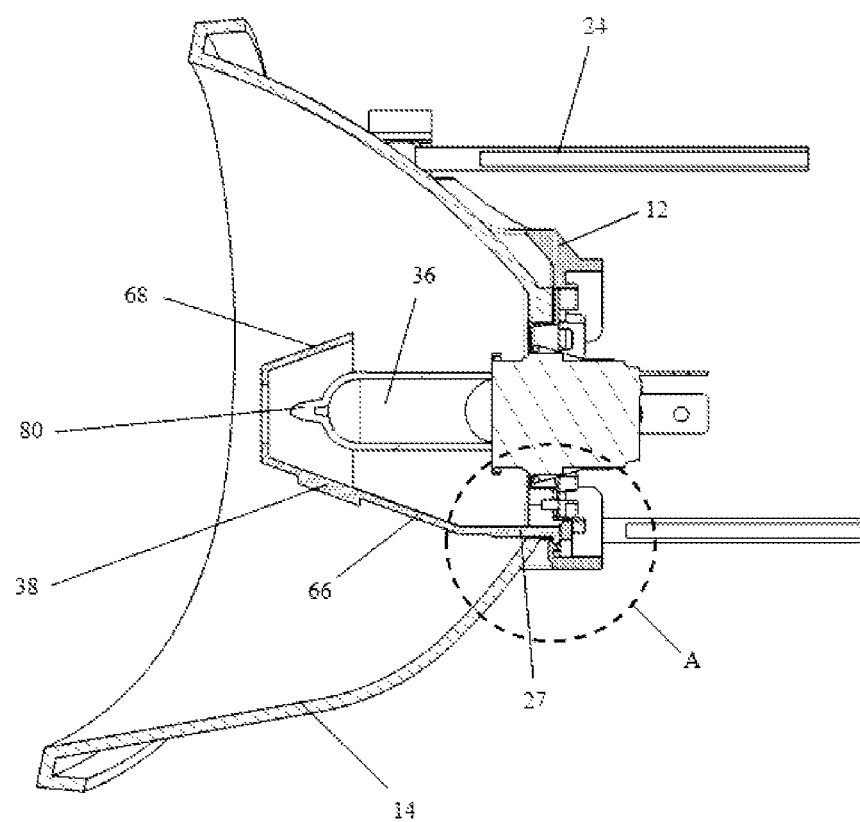
FIG. 3 is a cross-sectional view of an embodiment of a reflector and bracket assembly including a bulb shield fixing mechanism, which is depicted as a snap and located on the mounting bracket.
Figure 3A:
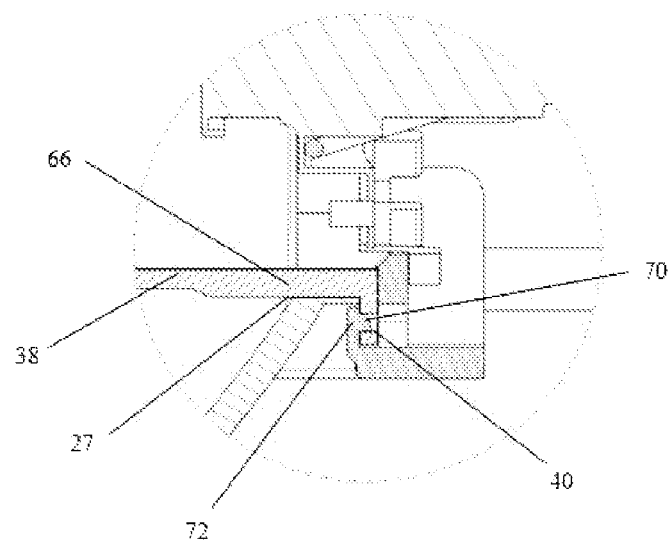
FIG. 3A is a cross-sectional partial view of section A of FIG. 3.
Figure 4:
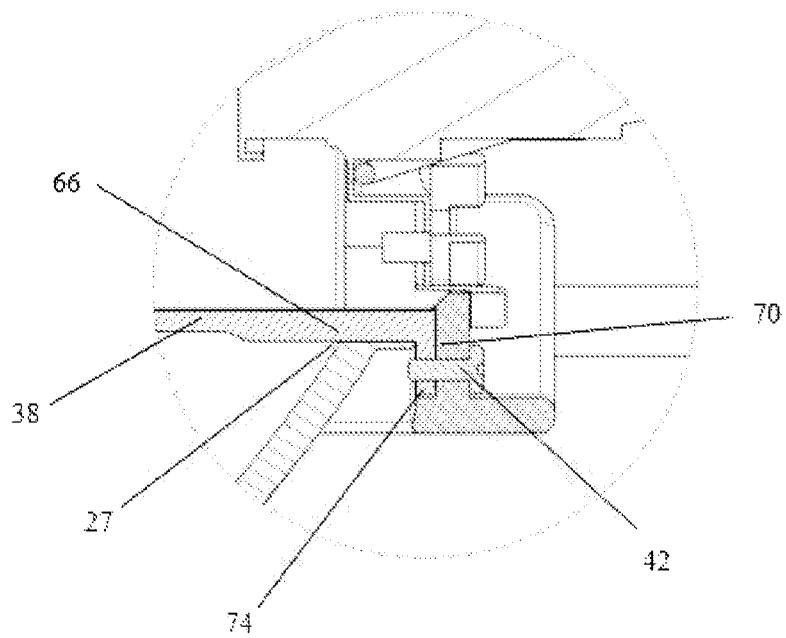
FIG. 4 is a cross-sectional partial view illustrating another embodiment of a reflector and bracket assembly including a bulb shield fixing mechanism illustrating the same area as section A of FIG. 3.
Figure 5:
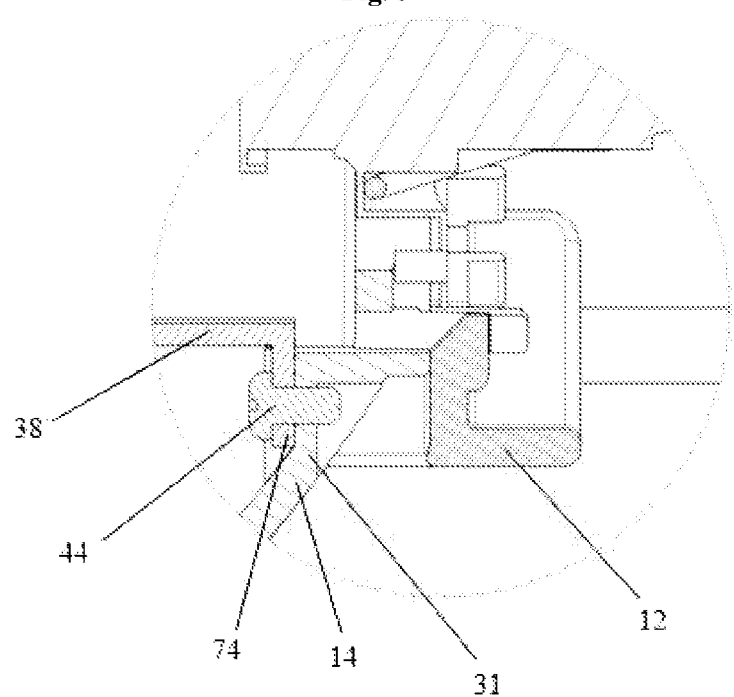
FIG. 5 is a cross-sectional partial view illustrating yet another embodiment of a reflector and bracket assembly including a bulb shield fixing mechanism illustrating the same area as section A of FIG. 3.

Mounting bracket 12 also can comprise a bulb shield fixing mechanism as shown in section A in FIG. 3, to attach a bulb shield 38 in front of the bulb 36, when the bulb is disposed into the reflector 14. The bulb shield 38 has an arm 66 that extends from a bulb cover 68 to an attachment region (within section A). The attachment region comprises a mechanism for securing the bulb shield in the headlamp assembly so that the cover 68 is oriented adjacent to tip 80 of bulb 36, e.g., so as to block light emitted from the bulb 36 that would be outside of a desired beam pattern. Examples of possible mechanisms for securing the bulb shield 38 include snap engagements, securing elements (e.g., screws, rivets, bolts, and so forth), pressure fits, as well as combinations comprising at least one of the foregoing. For example, FIG. 3A illustrates mating elements, wherein the arm 66 extends through the notch 27 in the reflector such that the bulb shield cavity 40 mates with the tang 70 on the reflector hook 72. It is clearly understood that the hook could be located on the bulb shield and the cavity in the mounting bracket. Alternatively, or in addition, as shown in FIGS. 4 and 5, the bulb shield 38 can be fixed to the mounting bracket 12 and/or the reflector 14. In FIG. 4, the arm 66 extends through the notch 27 such that a securing element 42 extends through the mounting bracket 12 and the bulb shield end 74 to secure them together. In FIG. 5 a securing element 42 extends through the bulb shield end 74 and the reflector 14 (e.g., the reflector lip 31) to secure them together without passing through a notch. It is further noted that combinations comprising any or all of the foregoing locations and structures for fixing mechanism could be employed.

The Example set forth below demonstrates advantageous results of embodiments disclosed herein.

EXAMPLE

Figure 8:
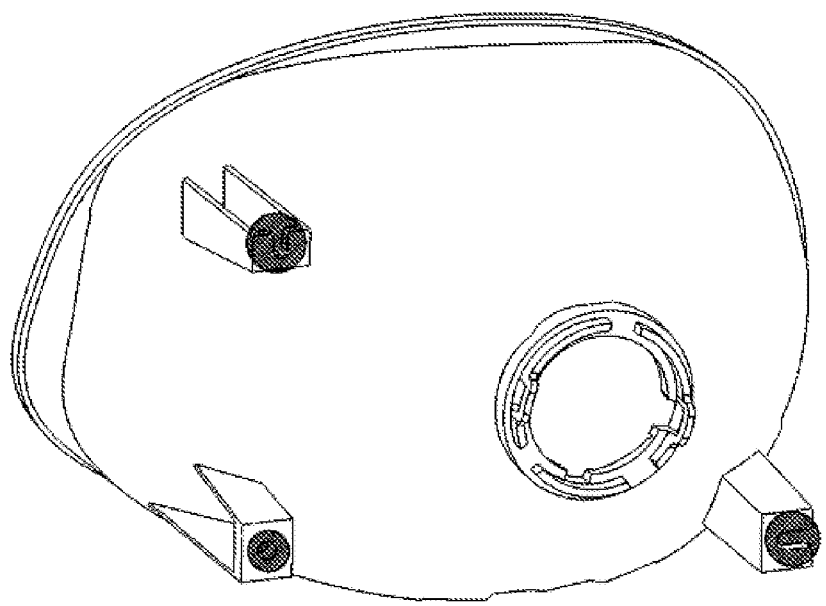
FIG. 8 depicts a rear perspective view of a reflector, referred to in the Example and including attachment structures located on the reflector itself.
Figure 9:
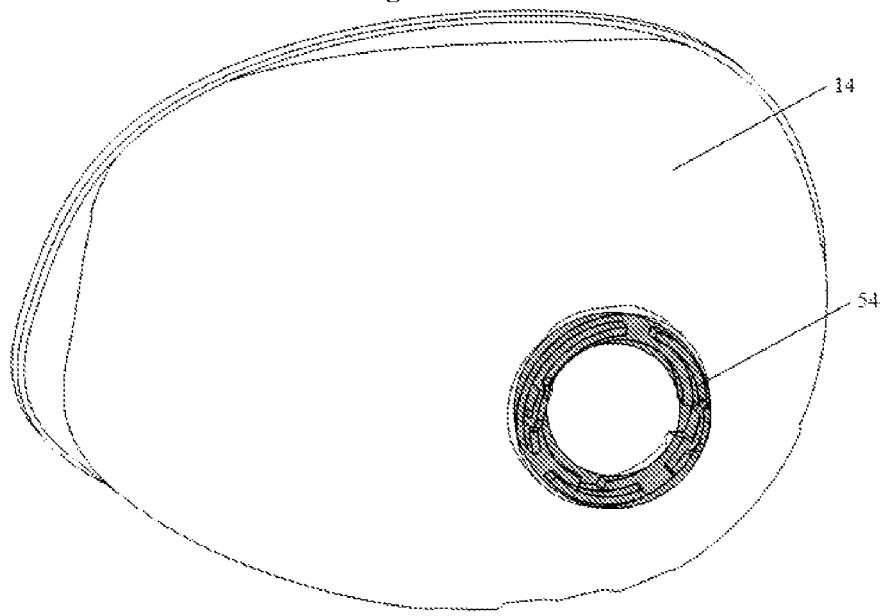
FIG. 9 depicts a rear perspective view of a reflector, in accordance with embodiments and referred to in the Example, wherein attachment structures as in FIG. 8 are not included as part of the reflector of FIG. 9.

Simulations with a headlamp assembly, in accordance with embodiments, resulted in beam angular deformations that were reduced by approximately up to 50% in both the horizontal and vertical directions when compared to a headlamp assembly including attachment structures located directly on the reflector. Specifically, an analysis regarding the aiming angle change for a reflector having three attachment/adjustment structures on a rear surface (e.g. a fixing location), as shown in FIG. 8, in comparison with a design, as shown in FIG. 9 where no attachment structures are located on the reflector, was conducted. FIG. 9 also depicts the boundary condition applied at location 54.

Figure 10:
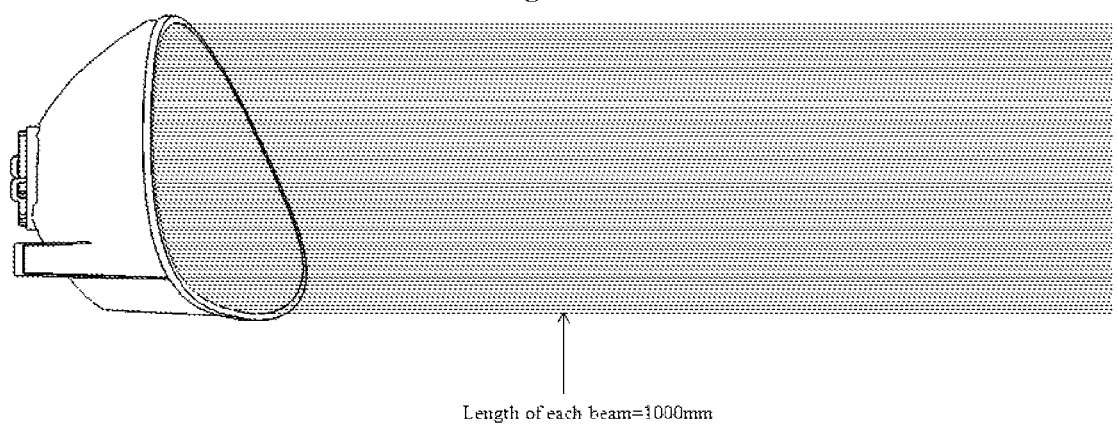
FIG. 10 depicts a schematic view of beams in an aiming angle change analysis referred to in the Example.

It has been determined that the aiming angles are measured from the change in beam angle at each location, as shown in FIG. 10, with the length of each beam being 1,000 millimeters (mm). Displacements were measured at the outer tip of each beam and angles were calculated from the displacement value.

FIG. 11 sets forth various nodes that were analyzed to observe the angular deformation in the horizontal and vertical directions. The study was conducted by creating one dimensional mass less beams as shown in FIG. 10 and analyzing and tabulating their angular movements. The hypothetical beams were attached to the reflector at the afore-referenced locations considered in the study.

Results of the comparison of angular deformations of the reflector with the mounting bracket versus the traditional mounting design of the comparative reflector are set forth in Tables 1 and 2, which specify the horizontal angle change and vertical angle change, respectively. As can be seen from Tables 1 and 2, a significant improvement resulted as demonstrated by the lesser degree in angle deformation change in both the horizontal and vertical angles.

TABLE 1

| | Horizontal Angle Change (in Degrees) | |
|---|---|---|
| Location | Traditional mounting | Mounting with new bracket |
| 463034 | 0.0236 | 0.0051 |
| 462995 | 0.0291 | 0.0118 |
| 463010 | 0.0251 | 0.0083 |
| 463054 | 0.0306 | 0.0157 |
| 463019 | 0.0105 | 0.0080 |
| 463029 | 0.0167 | 0.0018 |
| 463000 | 0.0134 | 0.0024 |
| 463049 | 0.0114 | 0.0081 |
| 463028 | 0.0112 | 0.0078 |
| 463030 | 0.0046 | −0.0125 |
| 463036 | −0.0005 | −0.0157 |
| 463043 | −0.0002 | −0.0179 |
| 463071 | 0.0100 | 0.0082 |
| 463081 | 0.0078 | 0.0110 |
| 463038 | −0.0031 | −0.0163 |
| 463026 | 0.0288 | 0.0122 |
| 463056 | 0.0112 | −0.0053 |
| 463058 | 0.0231 | 0.0060 |
| 463063 | 0.0246 | 0.0070 |
| 462991 | 0.0286 | 0.0139 |
| 463068 | 0.0233 | 0.0045 |
| 463066 | 0.0260 | 0.0082 |

TABLE 2

| | Vertical Angle Change (in Degrees) | |
|---|---|---|
| Location | Traditional mounting | Mounting with new bracket |
| 463034 | 0.0218 | 0.0005 |
| 462995 | 0.0273 | 0.0078 |
| 463010 | 0.0146 | 0.0107 |
| 463054 | 0.0106 | 0.0005 |
| 463019 | 0.0229 | 0.0103 |
| 463029 | 0.0196 | 0.0000 |
| 463000 | 0.0168 | 0.0037 |
| 463049 | 0.0111 | 0.0005 |
| 463028 | 0.0203 | 0.0104 |
| 463030 | 0.0291 | 0.0134 |
| 463036 | 0.0208 | 0.0071 |
| 463043 | 0.0150 | −0.0004 |
| 463071 | 0.0229 | 0.0032 |
| 463081 | 0.0237 | 0.0012 |
| 463038 | 0.0021 | −0.0068 |
| 463026 | 0.0124 | 0.0042 |
| 463056 | 0.0251 | 0.0051 |
| 463058 | 0.0149 | −0.0026 |
| 463063 | 0.0098 | 0.0048 |
| 462991 | 0.0017 | −0.0160 |
| 463068 | 0.0000 | 0.0000 |
| 463066 | 0.0181 | 0.0035 |

As can be seen from the above data, headlamp assemblies comprising the designs set forth herein have substantially improved beam angle change (e.g., reduced horizontal and vertical angle change). For nearly all the points considered, the horizontal angle change and vertical angle change has been reduced when comparing the simulated results incorporating the new bracket concept as compared to the simulated results incorporating the traditional bracket as shown in Table 1 and Table 2. For example, as is shown in the data above, with the mounting brackets disclosed herein, the absolute value of the horizontal angle change across the entire reflector can be less than or equal to 0.025, specifically less than or equal to 0.020, more specifically, less than or equal to 0.018, and even less than or equal to 0.015 in greater than or equal to 60% of the tested locations, specifically, greater than or equal to 75% of the tested locations. Also, the absolute value of the vertical angle change across the entire reflector can be less than or equal to 0.025, specifically less than or equal to 0.020, more specifically, less than or equal to 0.016, and even less than or equal to 0.015 in greater than or equal to 75% of the tested locations, specifically, greater than or equal to 90% of the tested locations.

In addition to allowing the reflector to freely expand in a more stress-free condition, as simulated in the analysis described above, the reflector mounting bracket 12 design eliminates the need for geometry on the back of the reflector which may compromise the integrity of the optical surface. It is well understood that elements such as ribs, gussets, bosses, and other structural geometries located on a plastic part, can result in a surface disruption (sink) on the part surface opposite of the element. This so-called sink is a result of a differential cooling of the molded material, and an associated higher level of shrinkage, resulting from the localized thickness and flow disturbance of the complicating element. The resulting shrink non-uniformity, manifest as a sink mark, has the risk of compromising the precise optical surface. As a result of the design of the reflector mounting bracket, the reflective portion (the rear surface of the reflector, e.g. the area opposite the reflective surface (the back of the reflective surface)) can be free of all the elements (ribs, gussets, bosses, connectors, bulb mounting features, adjustors, and bulb shield fixing features) that may complicate the optical surface as described above. The disclosed mounting bracket can significantly reduce the stress in the reflector and distortion of the resultant beam pattern associated with assembly, reflector geometry, and thermal expansion.

In one embodiment, a headlamp assembly can comprise: a reflector, a mounting bracket, a housing, and a light source. The reflector can have a lip at a light source opening and a peripheral rim with a reflector portion extending from the lip to a peripheral rim. The mounting bracket can be configured to attach to the reflector. The mounting bracket can comprise attachment structures configured to mate with the lip, and adjustment features that enable horizontal, vertical, and pivotal adjustment. The light source can extend into the reflector through the light source opening.

In one embodiment, a method of making a mounting bracket can comprise: injection molding a plastic (e.g., thermoplastic and/or thermoset) to form a mounting bracket to attach to a headlamp reflector, the mounting bracket comprising attachment structures configured to mate with a lip of the headlamp reflector, and adjustment features that enable horizontal, vertical, and pivotal adjustment.

In one embodiment, a mounting bracket configured to attach to a reflector can comprise attachment structures configured to mate with a lip at a reflector bulb opening, wherein the mounting bracket comprises adjustment features that enable horizontal, vertical, and pivotal adjustment.

In the various embodiments, (i) the adjustment features can be located so as to form a right triangle, and wherein the horizontal adjustment feature and the vertical adjustment feature form a hypotenuse; and/or (ii) the mounting bracket and the reflector can each comprise a section of a turn and lock mechanism and/or comprise a mating part of a snap mechanism; and/or (iii) the reflector can comprise a plastic material; and/or (iv) the reflector further comprises a second material that is different than the plastic material (e.g., the second material can be ceramic, metal, glass, thermoset, or a combination comprising at least one of the foregoing); and/or (v) the headlamp reflector only attaches to the mounting bracket at the lip; and/or (vi) the reflector is free of attachment elements on its back surface; and/or (vii) the reflector portion between the lip and the peripheral rim is smooth on both surfaces; and/or (viii) the attachment features can comprise a horizontal adjustment slider, a vertical adjustment slider, a clip holding mechanism, and a pivot mechanism; and/or (ix) the mounting bracket can further comprise a guide feature for mounting the light source, and an assembly slot located adjacent to the vertical adjustment; and/or (x) the attachment features can comprise a horizontal adjustment element, a vertical adjustment element, a clip holding mechanism, and a pivot mechanism; and/or (xi) the horizontal adjustment element and the vertical adjustment element can each comprise a portion of a slot and a plug in mechanism, the plug in mechanism configured to be inserted into the slot; and/or (xii) the mounting bracket can be configured to only attach to a lip surrounding a light source opening in a reflector; and/or (xiii) the mounting bracket comprises a turn and lock mechanism; and/or (xiv) the mounting bracket comprises a direct snap mechanism; and/or (xv) the mounting bracket comprises a thermoplastic material and/or a thermoset material. Also included herein are methods of making any of the above mounting brackets and headlamp assemblies, e.g., including using injection molding All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A headlamp assembly comprising:
    a reflector having a lip at a light source opening and a peripheral rim with a reflector portion extending from the lip to a peripheral rim;
    a mounting bracket configured to attach to the reflector, the mounting bracket comprising attachment structures configured to mate with the lip, and
    adjustment features that enable horizontal, vertical, and pivotal adjustment of the reflector without attachment of the adjustment features to the reflector portion;
    a housing; and
    a light source extending into the reflector through the light source opening;
    wherein, during use, adjustment of the reflector is achieved by translation of motion by the mounting bracket to the lip.

2. The headlamp assembly of claim 1, wherein the adjustment features are located so as to form a right triangle, and wherein the horizontal adjustment feature and the vertical adjustment feature form a hypotenuse.

3. The headlamp assembly of claim 1, wherein the mounting bracket and the reflector each comprise a section of a turn and lock mechanism and/or comprise a mating part of a snap mechanism.

4. The headlamp assembly of claim 1, wherein the reflector comprises a plastic material.

5. The headlamp assembly of claim 1, wherein the reflector further comprises a second material that is different than the plastic material.

6. The headlamp assembly of claim 1, wherein the reflector only attaches to the mounting bracket at the lip.

7. The headlamp assembly of claim 1, wherein the reflector is free of attachment elements on its back surface.

8. The headlamp assembly of claim 1, wherein the attachment features comprise a horizontal adjustment slider, a vertical adjustment slider, a clip holding mechanism, and a pivot mechanism.

9. The headlamp assembly of claim 1, wherein the mounting bracket further comprises a guide feature for mounting the light source, and an assembly slot located adjacent to the vertical adjustment.

10. The headlamp assembly of claim 1, wherein the attachment features comprise a horizontal adjustment element, a vertical adjustment element, a clip holding mechanism, and a pivot mechanism.

11. The headlamp assembly of claim 10, wherein the horizontal adjustment element and the vertical adjustment element each comprise a portion of a slot and a plug in mechanism, the plug in mechanism configured to be inserted into the slot.

12. A headlamp assembly comprising:
a reflector having a lip at a light source opening and a peripheral rim with a reflector portion extending from the lip to a peripheral rim;
a mounting bracket configured to attach to the reflector, the mounting bracket comprising
  attachment structures configured to mate with the lip;
  a guide feature for mounting a light source;
  adjustment features that enable horizontal, vertical, and pivotal adjustment of the reflector without attachment of the adjustment features to the reflector portion; and
  an assembly slot located adjacent to an adjustment feature;
a housing;
the light source extending into the reflector through the light source opening; and
a lens attached to the housing and enclosing the reflector;
wherein, during use, adjustment of the reflector is achieved by translation of motion by the mounting bracket to the lip.

13. A method of making a mounting bracket comprising:
injection molding a thermoplastic material to form a mounting bracket to attach to a reflector, the mounting bracket comprising attachment structures configured to mate with a lip of the reflector, adjustment features that enable horizontal, vertical, and pivotal adjustment of the reflector without attachment of the adjustment features to the reflector, and wherein, during use, adjustment of the reflector is achieved by translation of motion by the mounting bracket to the lip.

14. A mounting bracket configured to attach to a reflector, the mounting bracket comprising attachment structures configured to mate with a lip at a reflector bulb opening, wherein the mounting bracket comprises adjustment features that enable horizontal, vertical, and pivotal adjustment of the reflector without attachment of the adjustment features to the reflector and wherein, during use, adjustment of the reflector is achieved by translation of motion by the mounting bracket to the lip.

15. The mounting bracket of claim 14, wherein the adjustment features are located so as to form a right triangle, and wherein the horizontal adjustment feature and the vertical adjustment feature form a hypotenuse.

16. The mounting bracket of claim 14, comprising a section of a turn and lock mechanism and/or comprising a mating part of a snap mechanism.

17. The mounting bracket of claim 14, wherein the mounting bracket is configured to only attach to a lip surrounding a light source opening in a reflector.

18. The mounting bracket of claim 14, wherein the attachment features comprise a horizontal adjustment slider, a vertical adjustment slider, a clip holding mechanism, and a pivot mechanism.

19. The mounting bracket of claim 18, further comprising a guide feature for mounting the light source, and an assembly slot located adjacent to the vertical adjustment.

20. The mounting bracket of claim 14, wherein the attachment features comprise a horizontal adjustment element, a vertical adjustment element, a clip holding mechanism, and a pivot mechanism.

21. The mounting bracket of claim 20, wherein the horizontal adjustment element and the vertical adjustment element each comprise a portion of a slot and a plug in mechanism, the plug in mechanism configured to be inserted into the slot.

22. The mounting bracket of claim 14, wherein the attachment structures comprise a turn and lock mechanism.

23. The mounting bracket of claim 14, wherein the attachment structures comprise a direct snap mechanism.

24. The mounting bracket of claim 14, wherein the mounting bracket is a thermoplastic material and/or a thermoset material.

* * * * *